UNITED STATES PATENT OFFICE.

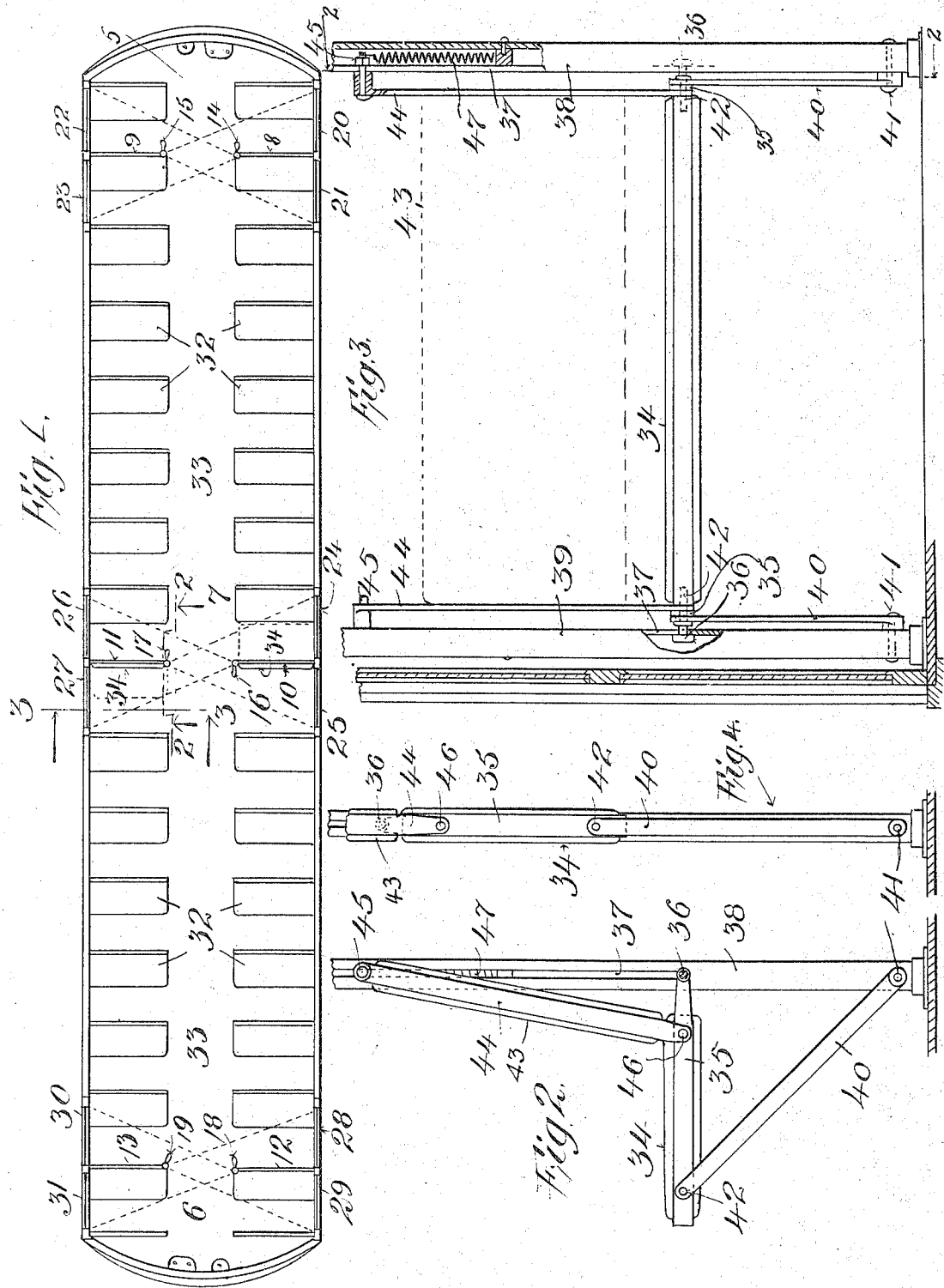

HAROLD ROWNTREE, OF KENILWORTH, ILLINOIS, ASSIGNOR TO NATIONAL PNEUMATIC COMPANY, OF NEW YORK, N. Y., A CORPORATION OF WEST VIRGINIA.

PASSENGER-CAR.

1,180,321.

Specification of Letters Patent.  Patented Apr. 25, 1916.

Application filed October 29, 1912. Serial No. 728,376.

*To all whom it may concern:*

Be it known that I, HAROLD ROWNTREE, a citizen of the United States, residing at Kenilworth, county of Cook, State of Illinois, have made a certain new and useful Invention in Passenger-Cars, of which the following is a specification.

This invention relates to passenger cars.

The object of the invention is to provide a construction of passenger car and seat therefor whereby the car is adapted for single or double ended, near-side, far-side or center entrance operation, and whether of the high or low floor level type.

A further object is to provide a seat structure designed for use in connection with a car having the above noted characteristics, and wherein the seat may be made to disappear or to be available as a seat facing forward whether the car is operating in one direction or the other.

Other objects of the invention will appear more fully hereinafter.

The invention consists substantially in the construction, combination, location and relative arrangements of parts, all as will be more fully hereinafter set forth, as shown in the accompanying drawing and finally pointed out in the appended claims.

In the drawing:—Figure 1 is a diagrammatic floor plan of a passenger car constructed and arranged in accordance with the principles of my invention. Fig. 2 is a broken view in vertical longitudinal section on the line 2, 2, Figs. 1 and 3, Fig. 3 is a similar view in vertical transverse section on the line 3, 3, Fig. 1. Fig. 4 is a view similar to Fig. 2, showing the seat closed up.

The same part is designated by the same reference sign wherever it occurs throughout the several views.

In accordance with the principles of my invention I provide the car with boarding and alighting platforms 5, 6, 7, respectively at the ends and the center of the car though it is obvious that the platform 7 may be located at any desired point intermediate the ends of the car. The platforms 5, 6, 7, extend across the car from side to side thereof, and a doorway is provided at each side of each platform. Disposed transversely the car opposite approximately the mid-width of each doorway opening is a barrier indicated at 8, 9, 10, 11, 12, 13, said barriers extending partway across the car and having door control stands, 14, 15, 16, 17, 18, 19, adjacent their inner extremities. It will thus be seen that the barriers divide the platform spaces immediately inside the associated doorways into two passages, one for entrance and one for exit of passengers. These entrance and exit ways or passages are controlled by suitable doors. In practice I prefer to employ separate doors, 20, 21, 22, 23, 24, 25, 26, 27, 28, 29, 30, 31. At each control stand is provided a control handle or other convenient means for controlling the movements and operation of the door or doors on the opposite side of the same platform. Thus, controlling means are located at the control stand 16, for illustration, for controlling or operating the doors 26, 27, while similarly, controlling means are located at the stand 17, for controlling or operating the doors 24, 25, as indicated by dotted lines in Fig. 1.

The seating arrangement inside the car may be of any suitable convenient or well known type. In practice, however, I prefer to employ cross seats, indicated at 32, respectively arranged on opposite sides to extend partially across the car, thereby leaving a longitudinal central aisle space 33. In order that passengers may face toward the forward end of the car, when occupying the seats, whether the one end or the other of the car is the forward end, the seats may be of the reversible back type, or may be of special reversible construction. In Figs. 2, 3, and 4, I have shown a simple arrangement of special reversible seat which is particularly well adapted for such use. In this arrangement the construction may be described as being of the disappearing seat type, wherein the seat proper 34, is provided with side members 35, having pintles 36, arranged to be received and to move vertically in longitudinal slots 37, in vertical standards 38, 39. Links 40, are pivotally attached at one end as at 41 to the standards 38, 39, and the lower ends thereof, are pivotally connected at their other ends as at 42 to the seat side bars 35, and preferbly adjacent the outer ends of said bars. The seat back portion 43 is similarly provided with side bars, as 44, having pintles 45, at their upper ends, arranged to be received and to slide up and down in the longitudinal slots 37 in the standards 38, 39. At their lower ends the seat back side bars 44, are pivotally connected, as at 46, to the seat side bars 35. With this arrangement it will be seen that when the seat is in position for use the pintles 36 of the seat side bars 35, rest in seats formed by the lower ends of the slots 37, the seat 34, occupying a horizontal position, as shown in Fig. 2, being held in this position by the combined action of the links 40 and the pintles 36, at the bottoms of their slots. If now, it is desired to collapse or fold up the seat the inner edge of the seat is raised thereby causing the pintles 36 and 45 to slide upwardly in the slots 37, the links 40, to rock about their pivots 41, the back section 43 and its side bars 44, to shift or move endwise upwardly, and the seat 34 to move into vertical position with the pintle ends of the side bars uppermost, thereby disappearing, so to speak, into the vertical plane of the side standards 38, 39, as shown in Fig. 4.

If desired the seat and back portion 34, 43, may be counterbalanced in any suitable or convenient manner in order to secure an easy operation and to facilitate the disappearing movements thereof. I have shown springs 47, for this purpose, said springs being arranged inside the hollow standards 38, 39, to exert their tension upon the pintle ends of the seat and back side bars in a direction tending to move the same upwardly.

In order to extend the seat structure from its folded up or disappearing relation into position to be used as a seat, the reverse of the above operation takes place. The links 40, are rocked outwardly from the position shown in Fig. 4, and the upper edges of the back and seat sections are forced downwardly thereby causing the seat and back portion to assume the positions thereof shown in Fig. 2 to form a seat.

It is obvious that the seat section 34, may be shifted from its collapsed or disappearing position shown in Fig. 4, into position to form a seat on either side of the standards 38, 39. Thus by swinging links 40 toward the right from the position thereof as shown in Fig. 4, the seat will be extended on the right hand side of the standards in identically the same manner as in the case where the said links are rocked toward the left from folded up position to extend the seat on the left of the standards as shown in Fig. 2.

It will be seen that a disappearing seat structure while, applicable to form the seats 32 of the car, being reversible as above explained, are particularly well adapted for use to form the division barriers 8, 9, 10, 11, 12, 13 for the reason that thereby the seating capacity of the car is increased by the use of the seats on one side or the other of the barriers, according to the direction of travel of the car, on that side of the car which is not used for the entrance and exit of passengers. This arrangement avoids the necessity of providing auxiliary seats for use in front of the doorways on that side of the car which is not used for the entrance and exit of passengers, and which is maintained closed.

In operation the conductor stands adjacent the control stand on the opposite side of the car from that where the doors to be operated are located. To illustrate, suppose the car is designed for center entrance operation with the doors 24, 25, to be operated to permit the passengers to board or alight from the car. In that case the seat which forms the barrier 10, will be folded up into disappearing relation, as above explained, while the seat 34, of the seat structure forming the barrier 11, will be distended into position to form a seat on one side or the other of the barrier 11, according to the direction in which the car is traveling so that a passenger occupying the same will face forwardly. The conductor will be stationed adjacent the control stand 17 from which station he will control the movements and operation of the doors 24, 25. At the same time the seat structures forming the barriers 8, 9, 12, 13, will be distended to form seats for passengers and to face in the required direction. The facing of the seat 34 in one direction or the other, leaves ample space on the opposite side of the barrier which is formed by the seat, to accommodate the conductor so that he will not be in the way of entering or leaving passengers, while at the same time he is located in a convenient position not only to control the operation of the doors but also to collect the fares of entering passengers as they enter.

It will be noted that while the seat structure opposite the door 24 is shown in extended position, in practice, when that door is used for the egress of passengers, the seat will be folded into its out of the way position similar to the seat 34. The same is true with respect to the seat lying opposite to the door 26, when that side of the car admits or discharges passengers.

For "near" or "far" side operation of the car, the above described operation is repeated, the only difference being that the conductor will be stationed at the front or rear end of the car, as the case may be, and at the control stand on one side or the other of the platform according to the direction of travel of the car, and opposite the doors to be operated, the seat structure forming the barrier inside the doors to be operated being folded into disappearing relation while that forming the barrier for the opposite doorway as well as those in the other doorways not being used, may be distended into position for use on one side or the other of the barrier according to the direction of travel of the car.

It is obvious that, if desired, and as common, a fare box or a fare register or other similar device may also be located at the conductor's control stand.

From the foregoing description it will be seen that I provide a door and seat arrangement for passenger cars which enables the car to be operated as a "near side" a "far side" or a "center entrance" car, and of the fare prepayment type where the incoming and outgoing passengers are separated from each other at the doorway, and where all the other advantages and benefits of fare prepayment, and safety operation of cars are attained without loss of seating space for passengers. It will also be seen that these results are accomplished by employing collapsible foldable or disappearing seat structures for the barriers at the doorways, and which are capable of being shifted into position for passengers to face forwardly in whichever direction the car may be traveling. It will also be seen that the arrangement above described enables the car to be used either for "near side," "far side" or "center entrance" operation without in any way altering the construction of the car by merely changing the location of the conductor from one point to another. It is obvious that the doors employed may be of any suitable or desired type and may be operated in any suitable or convenient manner, and by any ordinary and well known form of operating mechanism. It is also obvious that any suitable convenient or well known type of fixed or movable steps may be associated with each doorway in the usual manner.

Having now set forth the object and nature of my invention and a construction embodying the same, what I claim as new and useful, and of my own invention, and desire to secure by Letters Patent is,—

1. A passenger car having boarding and alighting platforms, one at each end and also one at a point intermediate its ends, side doorways for said platforms, and means located inside each doorway to divide the adjacent platform into separate passages, whereby said car is interconvertible to "near side," "far side," or "center entrance" operation.

2. A passenger car having a platform at each end and at a point intermediate its ends, side doorways for said platforms, doors for controlling the doorways, and means located on the platforms inside said doors to divide the platforms into separated passages.

3. A passenger car having platforms, one at each end and one intermediate its ends, side doorways and doors for said platforms, means arranged inside each door to divide the space inside said door into separate passages, and means located on the opposite sides of the platforms to control the doors.

4. A combined "near side" "far side" and "center entrance" car comprising a body having a seating space with doorways in the side thereof at each end and also intermediate its ends, and means arranged inside each doorway to divide the space inside said doorway into separated passages.

5. A combined "near side", "far side", and "center entrance" car, comprising a body having a seating space, with doorways opposite each other at each end and also intermediate the ends thereof, and means arranged inside each doorway to divide the space inside said doorway into separated passages.

6. A combined "near side", "far side", and "center entrance" car comprising a body having a seating space with doorways opposite each other at each end and also intermediate the ends thereof, a door for each doorway, means arranged inside each door to divide the space inside said door into separate passages, and means for operating the doors.

7. A combined "near side", "far side" and "center entrance" car comprising a body having a seating space with doorways in the side thereof at each end and also intermediate the ends thereof, doors for said doorways, means arranged inside each door to divide the space inside said door into separate passages, and means for controlling the operation of the doors.

8. A combined "near side", "far side", and "center entrance" car comprising a body having a seating space with doorways in the side at each end and also intermediate the ends thereof, doors for said doorways, means arranged inside each door to divide the space inside the door into separated passages, and means located on the opposite side of the car from each door for controlling the operation of the latter.

9. A combined "near side", "far side" and "center entrance" car comprising a body having a seating space with doorways opposite each other in the side at each end and also intermediate the ends thereof, a door for each doorway, means arranged inside each door to divide the space inside the door into separated passages, and means for operating the doors.

10. A combined "near side", "far side" and "center entrance" car comprising a body having a seating space with doorways opposite each other in the sides at each end and intermediate the ends thereof, doors for said doorways, means arranged inside each door to divide the space inside said door into separate passages, and means located on the opposite side of the car from each door to control the operation thereof.

11. A combined "near side", "far side" and "center entrance" car comprising a body having a seating space with doorways in its side at each end and also intermediate the ends thereof, doors for said doorways, and means located on the opposite side of the car from each door for controlling the operation of the door.

12. A combined "near side", "far side" and "center entrance" car comprising a body having a seating space with doorways arranged opposite each other in its sides at each end and intermediate the ends thereof, doors for said doorways, and means located on the opposite side of the car from each door for controlling the operation of said door.

13. A car having a side doorway, a seat frame arranged to divide the space inside said doorway into separate passages, and a disappearing seat carried by said frame.

14. A car having a side doorway at each end and also intermediate its ends, a seat frame arranged inside each doorway to divide the space inside the doorway into separated passages, and a disappearing seat carried by each seat frame.

15. A car having a side doorway, a seat frame arranged to divide the same into separated passages, and a reversible seat carried by said frame.

16. A car having oppositely arranged side doorways, doors for said doorways, means located on the opposite side of the car from each doorway for controlling said door, a seat frame located opposite each door to divide the space inside the door into separated passages, and a foldable disappearing seat carried by each seat frame.

17. A car having a side doorway in each side at each end intermediate the ends thereof, doors for said doorways, means located on the opposite side of the car from each door for controlling said door, a seat frame arranged inside each door to divide the space inside said door into separate passages, and a disappearing seat carried by each seat frame.

18. A car having a doorway and a door therefor, in the side thereof in combination with a frame located in the car and adjacent said doorway, a disappearing seat associated with said frame, and means associated with said frame for operating said doors.

19. A car having a doorway, a barrier located to divide the space controlled by the doorway into separated passageways, a disappearing seat associated with the barrier, a door for the doorway, and means mounted on said barrier for moving the door.

20. A car having a doorway and a door therefor, a transversely extending barrier located to divide the space controlled by the door into separated passageways, and a seat associated with said barrier, said seat being foldable into and out of position for use and means mounted on said barrier for operating said door.

21. A car having a doorway and a door in the side thereof and a cross seat located adjacent the doorway, and means whereby said cross seat is foldable into position to form a barrier to divide the space inside the door into separated passageways, and means mounted on said seat for operating said door.

22. A car having a longitudinal center aisle and a side doorway, a door for said doorway, cross seats on opposite sides of the aisle adjacent said doorway, said seats being foldable into and out of position for use, and means mounted on one of said cross seats for operating said door.

23. A car having doorways and doors in the sides thereof, operating devices for said doors, means for controlling said devices, the control devices for the doors on one side of the car being located adjacent the doorways on the opposite side of the car, and folding seats associated with said controlling devices.

24. A car having a longitudinal central aisle and side doorways and doors, and a control device for the doors of each doorway, the control device for the doors on one side of the aisle being located on the opposite side of the aisle and a disappearing cross seat associated with each control device.

25. A car having a longitudinal central aisle and side doorways and doors opposite each other on opposite sides of the aisle, a control device for the doors of each doorway, the control device for the doors on one side of the aisle being located opposite the central portion of the doorways on the other side of the aisle, and a folding seat associated with each control device.

26. A car having a longitudinal central aisle and side doorways and doors located opposite each other at the ends of the car, a control device for the doors of each doorway, the control device for the doors of one doorway being located adjacent the opposite doorways on the opposite side of the aisle, and a folding seat associated with each control device.

In testimony whereof I have hereunto set my hand in the presence of the subscribing witnesses, on this 26th day of October, A. D. 1912.

HAROLD ROWNTREE.

Witnesses:
S. E. DARBY.
W. A. DARBY.